(12) United States Patent
Biancale et al.

(10) Patent No.: US 11,845,520 B2
(45) Date of Patent: Dec. 19, 2023

(54) MANAGEMENT MODULE FOR A SAILING BOAT

(71) Applicant: SEA.AI GmbH, Linz (AT)

(72) Inventors: Raphaël Biancale, Linz (AT); Philipp Stampfl, Linz (AT)

(73) Assignee: SEA.AI GmbH, Linz (AT)

( * ) Notice: Subject to any disclaimer, the term of this patent is extended or adjusted under 35 U.S.C. 154(b) by 203 days.

(21) Appl. No.: 17/410,939

(22) Filed: Aug. 24, 2021

(65) Prior Publication Data
US 2022/0063776 A1 Mar. 3, 2022

(30) Foreign Application Priority Data
Sep. 1, 2020 (EP) ..................................... 20193974

(51) Int. Cl.
*B63B 49/00* (2006.01)
*B63B 79/40* (2020.01)
(Continued)

(52) U.S. Cl.
CPC ............. *B63B 79/40* (2020.01); *B63B 49/00* (2013.01); *B63B 79/15* (2020.01); *G01B 21/22* (2013.01); *G01C 19/00* (2013.01)

(58) Field of Classification Search
CPC ......... B63B 49/00; B63B 79/15; B63B 79/40; G01B 21/22; G01C 19/00; B63H 79/04; G05D 1/0206
See application file for complete search history.

(56) References Cited

U.S. PATENT DOCUMENTS 3,924,465 A * 12/1975 Sem-Sandberg ........ G01P 13/02
73/181
6,801,839 B2 * 10/2004 Kaji ..................... G05D 1/0206
701/533
(Continued)

FOREIGN PATENT DOCUMENTS

JP H03 32995 A 2/1991
JP H10 218084 A 8/1998
JP 2016 074236 A 5/2016

OTHER PUBLICATIONS

Cruz et al., Navigation performance of an autonomous sailing robot, 2015, IEEE, p. 1-7 (Year: 2015).*
(Continued)

*Primary Examiner* — McDieunel Marc
(74) *Attorney, Agent, or Firm* — KOS IP Law LLP

(57) ABSTRACT

The invention relates to a management module for a sailing boat, said sailing boat comprising a wind angle sensor configured to measure the wind angle value of the boat indicating the angle between the wind direction and the sailing direction of the sailing boat, said wind angle value being comprised between −180° and +180°, and an autopilot module configured to receive control commands and to control the trajectory of said sailing boat using said control commands, said management module being configured to receive the wind angle value from said wind angle sensor, generate a control command to control the wind angle of the boat between a first angle threshold and a second angle threshold wherein said first angle threshold and said second angle threshold are greater than or equal to 0° and smaller than or equal to +180° when the wind angle value is between 0° and +180° and greater than or equal to −180° and smaller than or equal to 0° when the wind angle value is between −180° and 0°, and send said generated control command to the autopilot module in order for said autopilot module to (Continued)

control the trajectory of the sailing boat using said control command.

15 Claims, 3 Drawing Sheets

(51) Int. Cl.
*B63B 79/15* (2020.01)
*G01B 21/22* (2006.01)
*G01C 19/00* (2013.01)

(56) References Cited

U.S. PATENT DOCUMENTS

2018/0215453 A1* 8/2018 Asscher ............... B63H 9/061
2021/0009249 A1* 1/2021 Epstein ............... B63B 49/00
2021/0342254 A1* 11/2021 Epstein ............... B63B 49/00

OTHER PUBLICATIONS

Alves et al., An FPGA-Based Embedded System for a Sailing Robot, 2009, IEEE, p. 830-837 (Year: 2009).*
Tranzatto et al., The debut of Aeolus, the autonomous model sailboat of ETH Zurich, 2015, IEEE, p. 1-6 (Year: 2015).*
Stelzer et al., Fuzzy Logic Control System for Autonomous Sailboats, 2007, IEEE, p. 1-6 (Year: 2007).*
European Search Report from the European Patent Office on co-pending EP application (EP20193974.1) dated Mar. 9, 2021.

* cited by examiner

MANAGEMENT MODULE FOR A SAILING BOAT

TECHNICAL FIELD

The invention relates to boat piloting and more particularly to a method and module for controlling the trajectory of a sailing boat. The present invention aims in particular at providing a solution of boat-embedded management module that allows optimizing the path of a sailing boat relatively to the wind direction.

BACKGROUND

It is known in the art to equip a boat with an autopilot module that allows driving the boat automatically. In existing solutions, the skipper of the boat enters a set point such as e.g., a target location or a course set point or a wind angle set point to be followed by the boat then the autopilot module controls the trajectory of the boat in order to follow said set point.

However, the autopilot module does not take into account the environment of the boat except for a geographical map database that allows to avoid lands and known obstacles.

There is thus a need for a reliable and efficient solution that allows to remedy at least partially these drawbacks.

SUMMARY

To this aim, the invention provides a management module for a sailing boat, said sailing boat comprising a wind angle sensor configured to measure the wind angle value of the boat indicating the angle between the wind direction and the sailing direction of the sailing boat, said wind angle value being comprised between −180° and +180°, and an autopilot module configured to receive control commands and to control the trajectory of said sailing boat using said control commands, said management module being configured to:
  receive the wind angle value from said wind angle sensor,
  generate at least one a control command to control the boat in order to keep the wind angle of the boat between a first angle threshold and a second angle threshold wherein said first angle threshold and said second angle threshold are:
    greater than or equal to 0° and smaller than or equal to +180° when the wind angle value is between 0° and +180°, and
    greater than or equal to −180° and smaller than or equal to 0° when the wind angle value is between −180° and 0°,
  send said generated control command to the autopilot module in order for said autopilot module to control the trajectory of the sailing boat using said control command.

The management module according to the invention allows to control the autopilot module using the wind angle value of the sailing boat in order to limit to wind angle of the boat to a range of wind angle values where the boat cannot tack or jibe. In other words, the management module provides control commands to the autopilot module that are within an evasion range of wind angle values that the boat must follow to avoid tacking or jibing. The management module allows thus to constrain the autopilot module within a given set range of wind angles in order to plan the path of the boat and avoid unwanted tacking or jibing.

Preferably, the first angle threshold is smaller than the second angle threshold when the wind angle value is between 0° and +180° and the first angle threshold is greater than the second angle threshold when the wind angle value is between −180° and 0°.

In an embodiment, the management module is configured to generate and send control commands periodically, for example every second.

In an embodiment, the first angle threshold and a second angle threshold are:
  strictly greater than 0° and strictly smaller than +180° when the wind angle value is strictly greater than 0° and strictly smaller than +180°, and
  strictly greater than −180° and strictly smaller than 0° when the wind angle value is strictly greater than −180° and strictly smaller than 0°.

For example, the first angle threshold may be equal to +30° when the wind angle value is between 0° and +180° and equal to −30° when the wind angle value is between −180° and 0° to avoid any tacking of the boat when the boat is upwind. For example, the second angle threshold may be equal to +175° when the wind angle value is between 0° and +180° and equal to −175° when the wind angle value is between −180° and 0° to be certain to avoid any jibing of the boat when the boat is downwind.

In an embodiment, the management module is configured to set the first angle threshold to a first predetermined value and the second angle threshold to a second predetermined value.

In an embodiment, the predetermined absolute value of the first angle threshold is between 10° and 40° and the predetermined value of the second angle threshold is between 160° and 180°, preferably between 170° and 178°.

In an embodiment, the management module is configured to receive or determine the course of the boat and the control command is generated in order to keep said course within a predefined course range relative to the boat course. The course may be derived from either the apparent wind angle, the true wind angle, the magnetic course or the GPS course. For example, the course range may be equal to [−20°; +20°] or [+0°; −20°].

In an embodiment, the predefined range is predefined in relation to the wind angle value. For example, if the wind angle value ranges between 0° and 90°, the course range may be equal to [−10°; +10°] and if the wind angle value ranges between 90° and 180°, the course range may be equal to [−20°; +20°].

In an embodiment, the received wind angle value is the apparent wind angle value and the management module is configured to receive a boat speed value indicating the speed of the boat and a wind speed value indicating the speed of the wind, to calculate the true wind angle value of the boat using the received apparent wind angle value, said boat speed value and said wind speed value and to generate the control commands using said true wind angle value. The apparent wind angle is the relative wind angle experienced by an observer on the boat when said boat is on motion, as the speed of the boat impact the measurement of said wind angle. The true wind angle is the wind angle measured from a fixed-Earth reference point.

In an embodiment, the management module is configured to receive at least one extra boat data and to modify the generated control command prior to sending said control command to the autopilot module, modifying thus the first angle threshold and the second angle threshold, using the received at least one extra boat data. The terms "extra boat data" are to be understood as data related to the boat other than the wind angle value.

In an embodiment, the at least one extra boat data is a wind speed value indicating the apparent speed of the wind and the management module is configured to modify the generated control command in order to modify the first angle threshold and the second angle threshold depending on said wind speed value, avoiding thus an overload on the rigging and sails of the boat.

In an embodiment, the received wind speed value is the apparent wind speed value and the management module is configured to receive a boat speed value indicating the speed of the boat and to calculate the true wind angle value of the boat using the received apparent wind speed value and said boat speed value.

In an embodiment, the management module is configured to determine the helm of the boat (weather helm or lee helm) using said wind speed value and to modify the first angle threshold and the second angle threshold depending on said determined helm.

In an embodiment, the management module is configured to access a memory zone, in which is stored a polar table of the boat, said polar table indicating the predicted boat speed depending on the wind angle and wind speed of the boat, to obtain in said polar table a wind angle value to be used for the boat using the received wind speed value and the boat speed value and to modify the control command based on said obtained wind angle value. Such polar table may be made using the polar diagram of the boat. The use of the polar diagram of the boat allows e.g. to predict weather helm of lee helm and to determine if the engine of the boat is running or not and/or the sails configuration of the boat.

In an embodiment, the at least one extra boat data is an information indicating that the engine of the boat is on or is a speed boat value indicating the speed of the boat and wherein the management module is configured to modify the generated control command in order to extend the range defined between the first angle threshold and the second angle threshold when the engine is on or when the speed boat value is smaller than a predetermined speed threshold.

In an embodiment, the at least one extra boat data comprises a boat heel value indicating the inclination of the heel and a boat speed value indicating the speed of the boat and the management module is configured to determine that the engine is on and if a sail is flying depending on said received boat heel value and boat speed value.

In an embodiment, the management module is configured to detect shallow water zones or obstacles and to modify the generated control command in order to avoid said detected shallow water zones or obstacles.

In an embodiment, the boat further comprising a sounder, said management module is configured to receive data from said sounder, to provide a plausibility check on the detected shallow water zones or obstacles using said received sounder data and to modify the generated control command based on said probability check. This allows to improve the accuracy of the positioning on the marine chart and therefore the generated control command.

In an embodiment, the at least one extra boat data is a tide stream data indicating the height of the tide and wherein the management module is configured to modify the generated control command based on the received tide stream value, enabling thus a safer evasion range depending on the actual tide stream.

In an embodiment, the at least one extra boat data comprises water current data indicating the direction and strength of the water current and the management module is configured to adapt the control commands to pass over said obstacle depending on said direction and strength of the water current.

In an embodiment, the boat comprises a satellite-based geolocation unit configured to determine the geolocation of the boat and a memory unit, said memory unit comprising a marine chart, and the management module is configured to improve the accuracy of the location of the boat compare to shallow waters and obstacles using said marine chart and the geolocation of the boat.

In an embodiment, the at least one extra boat data comprises a maximal yaw rate or g-force value to be applied to the boat and the management module is configured to modify the generated control command based on the received maximal yaw rate or g-force value. The evasion range can therefore be selected to adapt the turn of the boat to reduce the yaw rate.

In an embodiment, the at least one extra boat data comprises data from a gyroscopic sensor and the management module is configured to estimate the wave conditions based on said received gyroscopic data and to modify the generated control command based on the estimated wave conditions. For example, the evasion range may be reduced in case of high waves. This may be particularly useful when the boat might tend to jibe or to broach easily.

In an embodiment, the at least one extra boat data comprises a rudder angle value or a rudder force value and the management module is configured to determine a weather helm drag value or a lee helm drag value of the boat using the received rudder angle value or rudder force value and to modify the generated control command when the determined weather helm drag value or lee helm drag value is smaller than a predetermined drag threshold. For example, an important weather or lee helm can advantageously adapt the generated control command to reduce the evasion range. If a strong weather helm is determined, bearing the boat away may be not possible and luff is therefore the solution to evade. At the opposite, if a low weather helm is determined, evasion can be performed easily to leeward (bearing away).

In an embodiment, the at least one extra boat data comprises the sails configuration of the boat and the management module is configured to adapt the generated control command depending on said received sails configuration. For example, if a downwind sail is being flown (e.g., a spinnaker or a gennaker), the evasion range may be reduced because of a higher risk of crash jibe (evasion to leeward) and higher risk for a broach (evasion to windward). At the opposite, if no downwind sail is being flown, the evasion range may be extended.

In an embodiment, the at least one extra boat data comprises rigging tension data and the management module is configured to monitor the rigging forces based on said received rigging tension data and to adapt the generated control command to automatically to maneuver the boat to avoid rigging damages, allowing to ensure whether bearing away is possible or not. The rigging tension data may also be used to determine the sails configuration (i.e., combination) of the boat 1.

In an embodiment, the management module is configured to receive sheet control data and adapt the generated control command to adapt the evasion range when received sheet control data allows opening sheets. This allows to reduce the weather helm.

The invention also relates to a sailing boat comprising a management module as previously described and an autopilot module, said autopilot module being configured to receive control commands and to control the trajectory of said sailing boat using said control commands.

In an embodiment, the autopilot module is configured to control the trajectory of the sailing boat using the received control command for keeping the wind angle of the sailing boat between the first angle threshold and the second angle threshold.

In an embodiment, the autopilot module is configured to compute a path to be followed by the sailing boat.

The invention also relates to a method of optimizing the trajectory of a sailing boat relatively to the wind angle, said method comprising, for the management module as described here before, the steps of:
- receiving a wind angle value indicating the angle between the wind direction and the sailing direction of the sailing boat,
- generating a control command to control the wind angle of the boat between a first angle threshold and a second angle threshold wherein said first angle threshold and said second angle threshold are:
  - greater than or equal to 0° and smaller than or equal to +180° when the wind angle value is between 0° and +180°, and
  - greater than or equal to −180° and smaller than or equal to 0° when the wind angle value is between −180° and 0°,
- sending said generated control command to the autopilot module in order for said autopilot module to control the trajectory of the sailing boat using said control command.

In an embodiment, control commands are generated and sent periodically, for example every second.

In an embodiment, the first angle threshold and a second angle threshold are:
- strictly greater than 0° and strictly smaller than +180° when the wind angle value is strictly greater than 0° and strictly smaller than +180°, and
- strictly greater than −180° and strictly smaller than 0° when the wind angle value is strictly greater than −180° and strictly smaller than 0°.

For example, the first angle threshold may be equal to +30° when the wind angle value is between 0° and +180° and equal to −30° when the wind angle value is between −180° and 0° to avoid any tacking of the boat when the boat is headwind. For example, the second angle threshold may be equal to +175° when the wind angle value is between 0° and +180° and equal to −175° when the wind angle value is between −180° and 0° to avoid any jibing of the boat when the boat is downwind.

In an embodiment, the method comprises a preliminary step of determining the first angle threshold to a first predetermined value and the second angle threshold to a second predetermined value.

In an embodiment, the predetermined absolute value of the first angle threshold is between 10 and 40° and the predetermined value of the second angle threshold is between 170 and 178°.

In an embodiment, the method comprises the steps of receiving or determining, by the management module, the course of the boat, wherein the control command is generated in order to keep said course within a predefined course range relative to the boat course. The course may be derived from either the apparent wind angle, the true wind angle, the magnetic course or the GPS course. For example, the course range may be equal to [−20°; +20°] or [+0°; −20°].

In an embodiment, the predefined range is predefined in relation to the wind angle value. For example, if the wind angle value ranges between 0° and 90°, the course range may be equal to [−10°; +10°] and if the wind angle value ranges between 90° and 180°, the course range may be equal to [−20°; +20°].

In an embodiment, the received wind angle value is the apparent wind angle value and the method comprises the steps of receiving a boat speed value indicating the speed of the boat and a wind speed value indicating the speed of the wind, calculating the true wind angle value of the boat using the received apparent wind angle value, said received boat speed value and said received wind speed value and generating the control commands using said true wind angle value.

In an embodiment, the method comprises a step of receiving at least one extra boat data and modifying the generated control command prior to sending said control command to the autopilot module, modifying thus the first angle threshold and the second angle threshold, using the received at least one extra boat data.

In an embodiment, the at least one extra boat data is a wind speed value indicating the apparent speed of the wind and the method comprises the steps of adapting the generated control command in order to modify the first angle threshold and the second angle threshold depending on said wind speed value, avoiding thus an overload on the rigging and sails of the boat.

For example, the management module may increase the absolute value of the first angle threshold and reduce the absolute value of the second angle threshold when the wind speed value is above a predetermined wind speed threshold or depending on the polar table.

In an embodiment, the wind speed value is the apparent wind speed value and the method comprises the steps of receiving a boat speed value indicating the speed of the boat and calculating the true wind angle value of the boat using the received apparent wind speed value and said boat speed value.

In an embodiment, the method comprises the steps of determining the helm of the boat (weather helm or lee helm) using said wind speed value and modifying the first angle threshold and the second angle threshold depending on said determined helm.

In an embodiment, the method comprises the steps of accessing a memory zone, in which is stored a polar table of the boat, said polar table indicating the predicted boat speed depending on the wind angle and wind speed of the boat, obtaining in said polar table a wind angle value to be used for the boat using the received wind speed value and the boat speed value and modifying the control command based on said obtained wind angle value. Such a polar table may be made using the polar diagram of the boat. The use of the polar diagram of the boat allows to avoid an overload on the rigging and sails of the boat.

In an embodiment, the at least one extra boat data is an information indicating that the engine of the boat is on or is a speed boat value indicating the speed of the boat and the method comprises a step of modifying the generated control command in order to extend the range defined between the first angle threshold and the second angle threshold when the engine is on or when the speed boat value is smaller than a predetermined speed threshold.

In an embodiment, the at least one extra boat data comprises a boat heel value indicating the inclination of the heel and a boat speed value indicating the speed of the boat and the method comprises a step of determining that the engine is on depending on said received boat heel value and boat speed value.

In an embodiment, the method comprises the steps of detecting shallow water zones or obstacles and modifying the generated control command in order to avoid said detected shallow water zones or obstacles.

In an embodiment, the boat further comprising a sounder, the method comprises the steps of receiving data from said sounder, providing a plausibility check on the detected shallow water zones or obstacles using said received sounder data and modifying the generated control command based on said probability check.

In an embodiment, the at least one extra boat data is a tide stream value indicating and the method comprises a step of modifying the generated control command based on the received tide stream value, enabling thus a safer evasion range depending on the actual tide stream.

In an embodiment, the at least one extra boat data comprises water current data indicating the direction and strength of the water current and the method comprises the steps of adapting the control commands, for example to pass over said obstacle more easily downstream as upstream.

In an embodiment, the boat comprises a satellite-based geolocation unit configured to determine the geolocation of the boat and a memory unit, said memory unit comprising a marine chart, the method comprises the steps of improving the accuracy of the location of the boat compare to shallow waters and obstacles using said marine chart and the geo-location of the boat.

In an embodiment, the at least one extra boat data comprises a maximal yaw rate or g-force value to be applied to the boat and the method comprises a step of modifying the generated control command based on the received maximal yaw rate or g-force value.

In an embodiment, the at least one extra boat data comprises data from a gyroscopic sensor and the method comprises the steps of estimating the wave conditions based on said received gyroscopic data and modifying the generated control command based on the estimated wave conditions. For example, the evasion range may be reduced in case of high waves to avoid damaging the boat. This may be particularly useful when the boat might tend to jibe or to broach easily.

In an embodiment, the at least one extra boat data comprises a rudder angle value or a rudder force value and the method comprises the steps of determining a weather helm drag value or a lee helm drag value of the boat using the received rudder angle value or rudder force value and modifying the generated control command when the determined weather helm drag value or lee helm drag value is smaller than a predetermined drag threshold. For example, an important weather or lee helm can advantageously lead to adapt the generated control command to reduce the evasion range.

In an embodiment, the at least one extra boat data comprises the sails configuration of the boat and the method comprises a step of adapting the generated control command depending on said received sails configuration.

In an embodiment, the at least one extra boat data comprises rigging tension data and the method comprises the steps of monitoring the rigging forces based on said received rigging tension data and adapting the generated control command to automatically to maneuver the boat to avoid rigging damages. This allows to check whether bearing away is possible or not before generating the control command.

In an embodiment, the method comprises the steps of receiving sheet control data and adapting the generated control command to adapt the evasion range when received sheet control data allows opening sheets. This allows to reduce the weather helm.

The invention also relates to a method of optimizing the trajectory of a sailing boat as described here before relatively to the wind angle, said method comprising the steps of:
measuring the wind angle value using a measurement module,
sending, by said measurement module, the measured wind angle value to the management module,
receiving, by the management module, the sent wind angle value indicating the angle between the sailing direction of the sailing boat and the wind direction,
generating a control command to control the wind angle of the boat between a first angle threshold and a second angle threshold wherein said first angle threshold and said second angle threshold are:
greater than or equal to 0° and smaller than or equal to +180° when the wind angle value is between 0° and +180°, and
greater than or equal to −180° and smaller than or equal to 0° when the wind angle value is between −180° and 0°,
sending said generated control command to the autopilot module in order for said autopilot module to control the trajectory of the sailing boat using said control command,
controlling the trajectory of the sailing boat using the received control command for keeping the wind angle of the sailing boat between the first angle threshold and the second angle threshold.

DETAILED DESCRIPTION

The management module according to the invention allows to control the autopilot of a sailing boat in order to optimize the trajectory of said sailing boat for avoiding any tacking or jibing. The control is based on the measure of the angle between the wind and the boat and allows to derive a range of possible angles within which the boat can navigate and evade.

The invention applies to a sailing boat navigating on a water area such as e.g. an ocean, a sea, a lake or any water area suitable for a sailing boat. The sailing boat may be a racing boat or a cruising boat.

Sailing Boat 1

Figure 1:
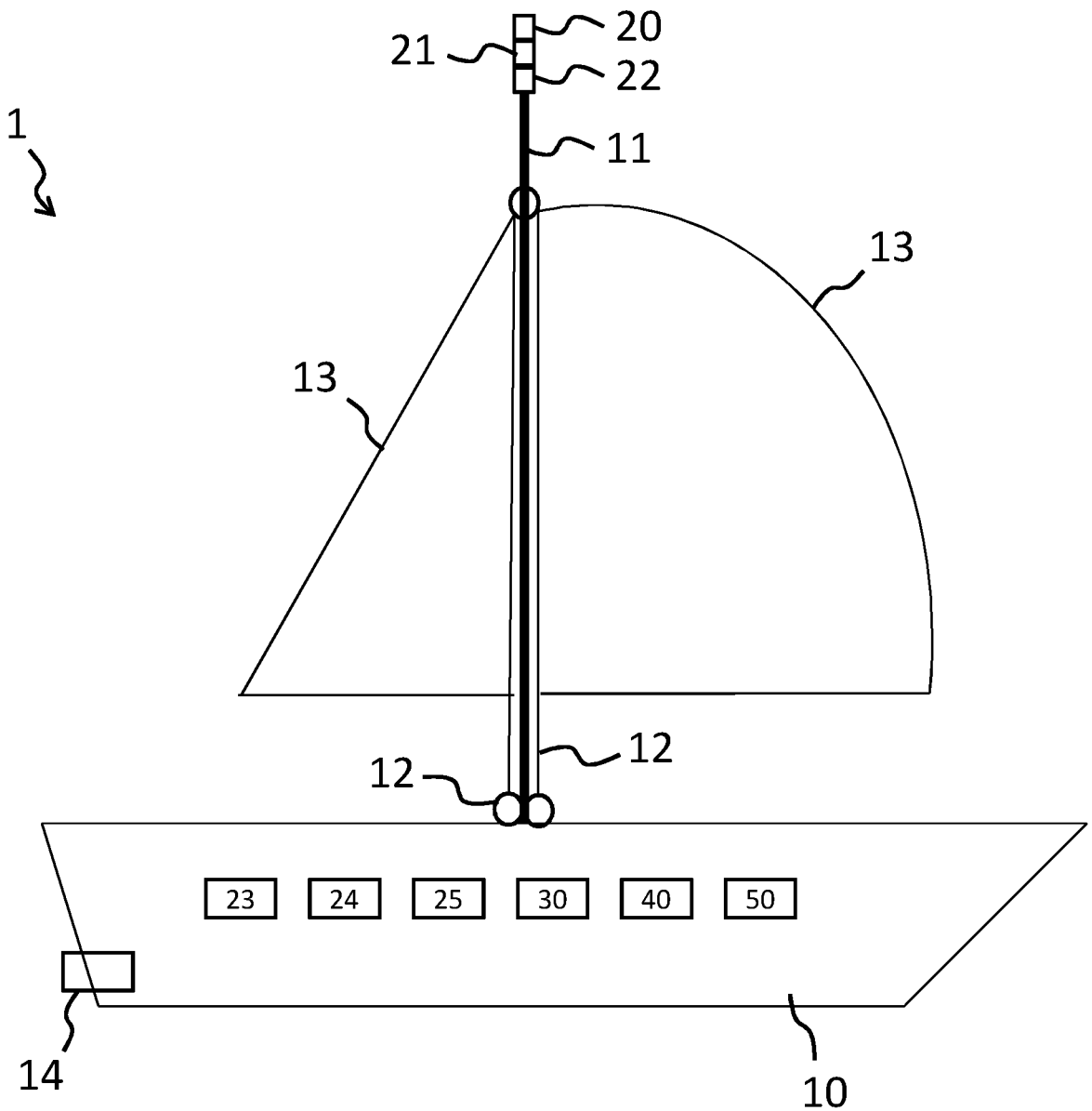
FIG. 1 schematically illustrates an exemplary embodiment of a boat according to the invention.

FIG. 1 illustrates schematically a sailing boat 1 according to the invention. In this example, the sailing boat 1 comprises a hull 10, a mast 11, a rigging 12, sails 13, an engine 14, a wind angle sensor 20, a wind speed sensor 21, a gyroscopic sensor 22, a satellite-based geolocation unit 23, a sounder 24, a heel sensor 25, an on-board computer 30, a management module 40 and an autopilot module 50.

The on-board computer 30 comprises a processor and a memory unit (not represented). A polar table, a marine chart of the environment of the boat 1, a tide stream information database are stored in the memory unit. The polar table is based on the polar diagram of the boat 1, known as such in the art, and gives the theoretical speed of the boat depending on the wind angle and wind speed.

In an embodiment, the on-board computer 30, the management module 40, the autopilot module 50 are different physical entities. In another embodiment, the management module 40 and the autopilot module 50 may be functions operated by the on-board computer 30. In other embodiments, any of the management module 40 and/or the autopilot module 50 may be operated by the on-board computer 30 and the others be stand-alone physical entities.

When the wind blows, the boat 1 wherein its angle to the wind direction, which is called the wind angle value. The wind angle value can be the apparent wind angle value (angle of the wind from a sailing boat 1 repository) or the true wind angle value (angle of the wind from a fixed Earth repository). Both apparent and true wind angle values may be available onboard the boat 1.

Wind Angle Repository 100

Figure 2:
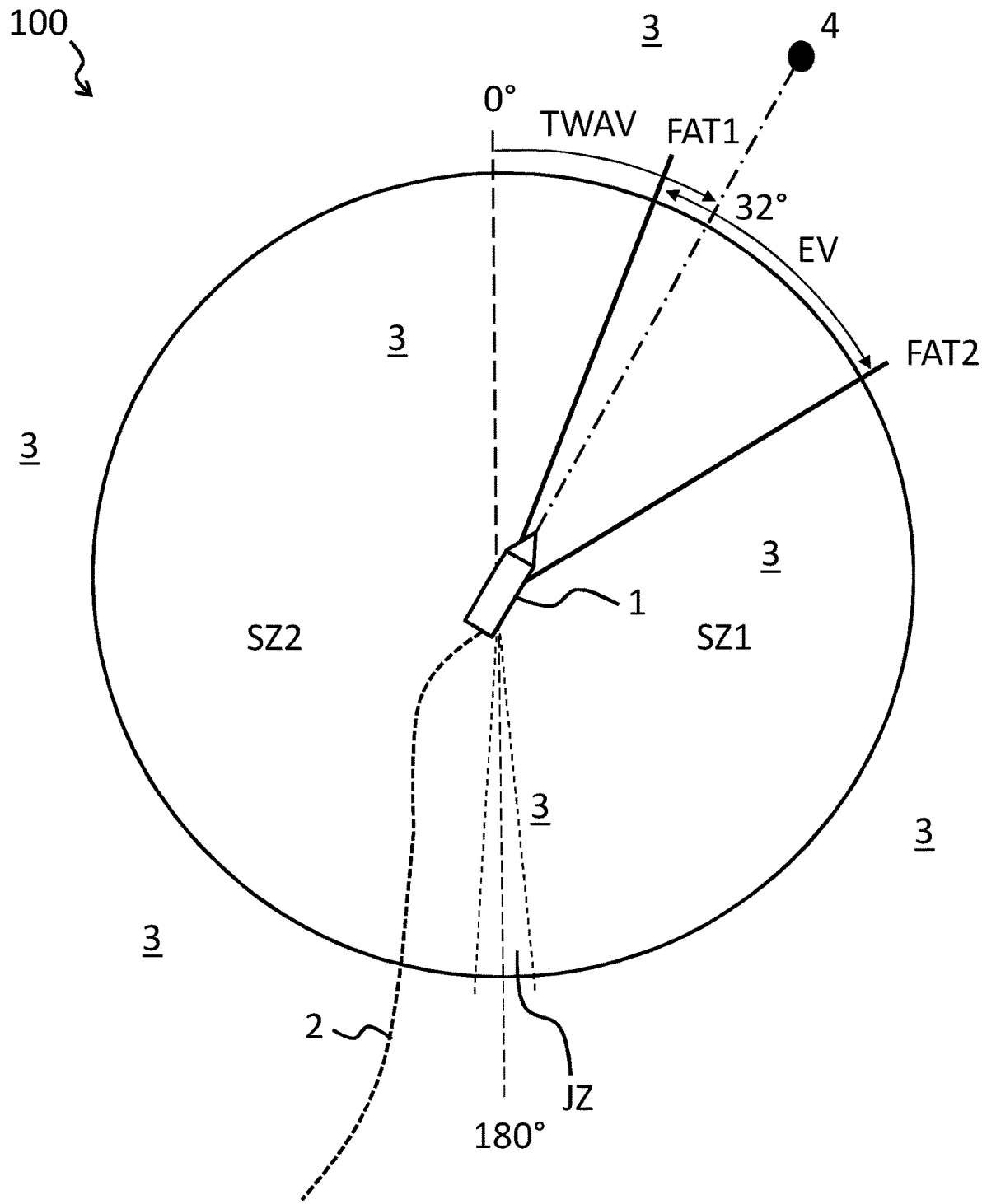
FIG. 2 schematically illustrates a boat repository according to the invention.
Figure 3:
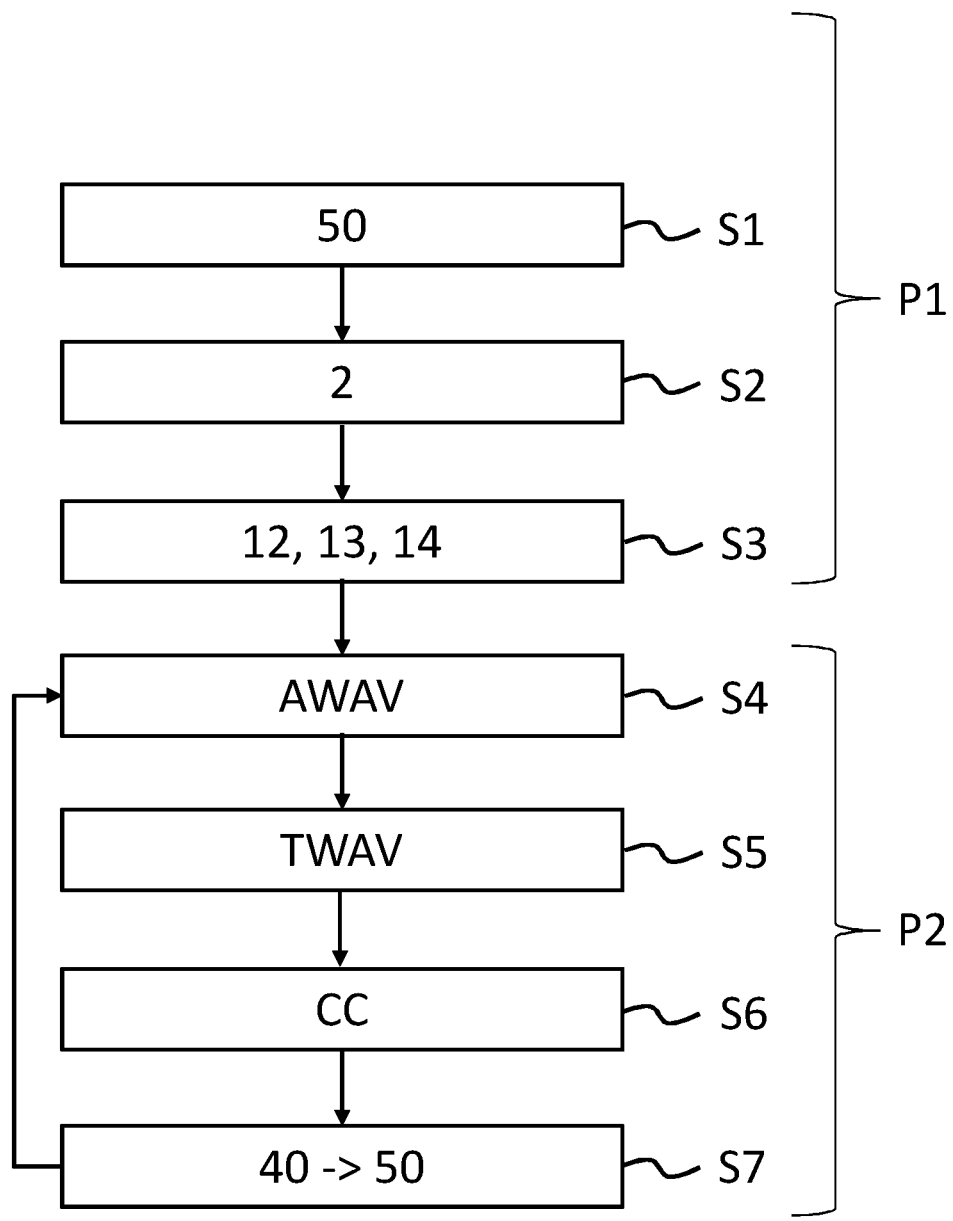
FIG. 3 illustrates an exemplary embodiment of the method according to the invention.

As illustrated on FIG. 2, the sailing boat 1 navigates on a path 2 in a water area 3 toward a target direction 4 and may be represented in a wind angle repository 100 attached to the sailing boat 1 and in which the sailing boat 1 forms the true wind angle value TWAV with the wind direction. The wind angle value can range between −180° and +180°, where 0° corresponds to full headwind and −180°=+180° corresponds to full tailwind. In the example of FIG. 2, the true wind angle value TWAV is equal to 32°.

At any time, the wind angle repository wherein a first angle threshold FAT1 and by a second angle threshold FAT2. When the sailing boat 1 navigates between 0° and 180°, the first angle threshold FAT1 and the second angle threshold FAT2 are between 0° and 180° to avoid any tack or jibe of the boat 1. Similarly, when the sailing boat 1 navigates between 0° and −180°, the first angle threshold FAT1 and the second angle threshold FAT2 are between 0° and −180°. The first angle threshold FAT1 and the second angle threshold FAT2 define the "evasion range" EV of the boat 1, i.e., the range of wind angles that the management module 40 allows for the boat 1 through the autopilot module 50. In the example of FIG. 2, the first angle threshold FAT1 is equal to 20° and the second angle threshold FAT2 is equal to 60°. The range of wind angles can be a range of true wind angles or apparent wind angles. Indeed, apparent wind data are easier to obtain as these data are directly provided by the wind angle sensor 20. However, from a sailor's point of view, true wind data constitute more relevant data, but need further accurate input data like wind speed and boat speed to be calculated.

Management Module 40

The management module 40 comprises a processor and a memory zone. The predefined values of the first angle threshold FAT1 and of the second angle threshold FAT2 are advantageously stored in a memory unit (not represented on the drawings) of the management module 40.

The management module 40 is configured to receive, from the wind angle sensor 20, the apparent wind angle value indicating the apparent angle between the wind direction and the sailing direction of the boat 1. The apparent wind angle is the relative wind angle experienced by an observer on the boat 1 when said boat is on motion, as the speed of the boat 1 impact the measurement of said wind angle.

The management module 40 is configured to receive, for example from the on-board computer 30, the boat speed value indicating the speed of the boat 1 and the wind speed value indicating the speed of the wind, to calculate the true wind angle value TWAV of the boat 1 using the received apparent wind angle value, said boat speed value and said wind speed value and to generate the control commands using said true wind angle value. The true wind angle is the wind angle measured from a fixed-Earth reference point.

The management module 40 is configured to generate a control command to control the wind angle of the boat between the first angle threshold FAT1 and the second angle threshold FAT2 wherein the first angle threshold FAT1 and the second angle threshold FAT2 are greater than or equal to 0° and smaller than or equal to +180° when the true wind angle value TWAV is between 0° and +180° or greater than or equal to −180° and smaller than or equal to 0° when the true wind angle value TWAV is between −180° and 0°, in order to avoid any tack or jibe of the boat 1.

In an embodiment, the first angle threshold FAT1 and a second angle threshold FAT2 are strictly greater than 0° and strictly smaller than +180° when the true wind angle value is strictly greater than 0° and strictly smaller than +180°, and strictly greater than −180° and strictly smaller than 0° when the true wind angle value is strictly greater than −180° and strictly smaller than 0°.

The management module 40 may be configured to generate and send control commands periodically, for example every second, to the autopilot 50.

In an embodiment, the management module 40 is configured to set the first angle threshold FAT1 to a first predetermined value and the second angle threshold FAT2 to a second predetermined value that may be stored in the memory unit of the management module 40.

The first angle threshold FAT1 and the second angle threshold FAT2 define a first sailing zone SZ1 comprised between 0° and +180°, a second sailing zone SZ2 comprised between −180° and 0° and a jibe zone JZ. In an embodiment, the predetermined absolute value of the first angle threshold FAT1 is between 10 and 40° and the predetermined value of the second angle threshold FAT2 is between 170 and 178°. For example, the first angle threshold FAT1 may be set to +30° when the wind angle value is between 0° and +180° and to −30° when the wind angle value is between 0° and −180° to avoid any tacking of the boat 1 when the boat 1 is headwind and the second angle threshold FAT2 may be set to +175° when the wind angle value is between 0° and +180° and to −175° when the wind angle value is between 0° and −180° to avoid any jibing of the boat 1 when the boat 1 is downwind.

The management module 40 is configured to receive or determine the course of the boat 1 and to generate the control command in order to keep said course within a predefined course range relatively to the course of the boat 1. Such a course range prevents the boat 1 to come in dangerous speed or forces areas due to the course change or to increase collision risks due to the unknown environment when changing the course. In any case, whatever the predefined course range, the wind angle value remains between the first angle threshold FAT1 and the second angle threshold FAT2.

The course may be derived from either the apparent wind angle, the true wind angle, the magnetic course or the GPS course. For example, the course range may be equal to [−20°; +20°] or [+0°; −20°].

In an embodiment, the predefined range is predefined in relation to the wind angle value. For example, if the wind angle value ranges between 0° and 90°, the course range may be equal to [−10°; +10°] and if the wind angle value ranges between 90° and 180°, the course range may be equal to [−20°; +20°].

The first angle threshold FAT1 and the second angle threshold FAT2 may be adapted at any time depending to the environment or the steering of the boat 1. In this example, the management module 40 is configured to receive at least one extra boat data and to modify the generated control command using the received at least one extra boat data prior to sending said control command to the autopilot module 50, modifying thus the first angle threshold FAT1 and/or the second angle threshold FAT1. The terms "extra boat data" are to be understood as data related to the boat 1 other than the wind angle value. For example, such data may be provided by the wind speed sensor 21, the gyroscopic sensor 22, the satellite-based geolocation unit 23, the sounder 24, the heel sensor 25 or the on-board computer 30 or be stored in the memory zone of the management module 30.

In an embodiment, the at least one extra boat data is a wind speed value indicating the apparent speed of the wind and the management module 40 is configured to modify the generated control command in order to modify the first angle threshold FAT1 and the second angle threshold FAT1 depending on said wind speed value, avoiding thus an overload on the rigging 12 and sails 13 of the boat 1. For example, the management module 40 may increase the absolute value of the first angle threshold FAT1 and reduce the absolute value of the second angle threshold FAT2 when the wind speed value is above a predetermined wind speed threshold or depending on the polar table of the boat 1.

In an embodiment, the wind speed value is the apparent wind speed value and the management module 40 is configured to receive a boat speed value indicating the speed of the boat 1 and to calculate the true wind angle value of the boat 1 using the received apparent wind speed value and said boat speed value.

In an embodiment, the management module 40 is configured to determine the helm of the boat 1 (weather helm or lee helm) using said wind speed value and to modify the first angle threshold FAT1 and the second angle threshold FAT2 depending on said determined helm.

In an embodiment, the management module 40 is configured to read in the polar table a wind angle value to be used for the boat 1 using the received wind speed value and to modify the control command based on said obtained wind angle value. The use of the polar table allows thus to avoid an overload on the rigging 12 and sails 13 of the boat 1.

In an embodiment, the at least one extra boat data is an information indicating that the engine 14 of the boat 1 is on or is a speed boat value indicating the speed of the boat 1 and the management module 40 is configured to modify the generated control command in order to extend the range defined between the first angle threshold FAT1 and the second angle threshold FAT2 when the engine 14 is on or when the speed boat value is smaller than a predetermined speed threshold.

In an embodiment, the at least one extra boat data comprises a boat heel value indicating the inclination of the heel and a boat speed value indicating the speed of the boat 1 and the management module 40 is configured to determine that the engine 14 is on depending on said received boat heel value and boat speed value.

In an embodiment, the management module 40 is configured to detect shallow water zones or obstacles and to modify the generated control command in order to avoid said detected shallow water zones or obstacles.

In an embodiment, the management module 40 is configured to receive data from the sounder 24, to provide a plausibility check on the detected shallow water zones or obstacles using said received sounder data and to modify the generated control command based on said probability check. This allows to improve the accuracy of the positioning on the marine chart and therefore the generated control command.

In an embodiment, the at least one extra boat data is a tide stream data indicating the height of the tide and wherein the management module 40 is configured to modify the generated control command based on the received tide stream value, enabling thus a safer evasion range EV depending on the actual tide stream. For example, if according to the tide stream data and current time, water is at a specific height (e.g., high water), then it may be possible to sail over some shallow areas, which would not be possible if at that current time, it was low water.

In an embodiment, the at least one extra boat data comprises water current data indicating the direction and strength of the water current and the management module 40 is configured to adapt the control commands to pass over said obstacle using the direction and strength of the water current.

In an embodiment, the management module 40 is configured to improve the accuracy of the location of the boat 1 compare to shallow waters and obstacles using said marine chart and the geolocation of the boat 1 given by the satellite-based geolocation module 40.

In an embodiment, the at least one extra boat data comprises a maximal yaw rate or g-force value to be applied to the boat 1 and the management module 40 is configured to modify the generated control command based on the received maximal yaw rate or g-force value. The evasion range EV can therefore be selected to adapt the turn of the boat 1 to reduce the yaw rate.

In an embodiment, the at least one extra boat data comprises data from the gyroscopic sensor 22 and the management module 40 is configured to estimate the wave conditions based on said received gyroscopic data and to modify the generated control command based on the estimated wave conditions. For example, the evasion range EV may be reduced in case of high waves. This may be particularly useful when the boat might tend to jibe or to broach easily.

In an embodiment, the at least one extra boat data comprises a rudder angle value or a rudder force value and the management module 40 is configured to determine a weather helm drag value or a lee helm drag value of the boat 1 sing the received rudder angle value or rudder force value and to modify the generated control command when the determined weather helm drag value or lee helm drag value is smaller than a predetermined drag threshold. For example, an important weather or lee helm can advantageously adapt the generated control command to reduce the evasion range EV. If a strong weather helm is determined, bearing the boat 1 away may be not possible and luff is therefore the solution to evade. At the opposite, if a low weather helm is determined, evasion can be performed easily to leeward (bearing away).

In an embodiment, the at least one extra boat data comprises the sails 13 configuration of the boat 1 and the management module 40 is configured to adapt the generated control command depending on said received sails configuration. For example, if a downwind sail is being flown (e.g. a spinnaker or a gennaker), the evasion range may be reduced because of a higher risk of crash jibe (evasion to leeward) and higher risk for a broach (evasion to windward). At the opposite, if no downwind sail is being flown, the evasion range may be reduced.

In an embodiment, the at least one extra boat data comprises rigging tension data and the management module 40 is configured to monitor the rigging forces based on said received rigging tension data and to adapt the generated control command to automatically to maneuver the boat 1 to avoid rigging damages, allowing to ensure whether bearing away is possible or not.

In an embodiment, the management module 40 is configured to receive sheet control data and adapt the generated control command to adapt the evasion range when received sheet control data allows opening sheets. This allows to reduce the weather helm.

Autopilot Module 50

The autopilot module 50 is configured to receive control commands sent by the management module 40 and to control the trajectory of the sailing boat 1 using said received control commands. The control command are treated as set point by the autopilot module 50. For example, the control command may be a course or a wind angle.

Operation

When the sailing boat 1 is navigating on a path 2 in a water area 3, such as e.g. on the ocean, the boat 1 may be placed in different position in regard to the wind angle as the course of the boat 1 and/or the absolute wind direction may vary with time. According to the invention, the wind angle of the sailing boat 1 is between 0 and 180° or between −180° and 0°.

At first, in a preliminary phase P1, the skipper (or any other crew member) of the boat 1 may program the autopilot module 50 in a step S1 in order for the boat 1 to automatically reach a target destination. For example, the skipper may either enter the coordinates of the target 4 destination or select a target 4 destination on a geographical map stored in the memory unit of the management device 30. Once the autopilot module 50 has been programmed, the autopilot module 50 computes a path 2 up to the target destination in a step S2 and controls the rigging 12, the sails 13 and/or the engine 14 in a step S3 to aim towards the target destination 4.

Before or at the start of the navigation, the first angle threshold FAT1 and the second angle threshold FAT2 can be determined, for example by the skipper, and stored in the memory zone of the management module 40. Alternatively, the first angle threshold FAT1 and the default second angle threshold FAT2 may be stored permanently in the memory zone of the management module 40 and have the same default values at each start of the management module 40.

For example, when the true wind angle value of the sailing boat 1 is between 0° and 180°, the first angle threshold FAT1 may be set up at +30° and the second angle threshold FAT2 may be set up at +175°. Similarly, when the true wind angle value of the sailing boat 1 is between −180° and 0°, the first angle threshold FAT1 may be set up at −30° and the second angle threshold FAT2 may be set up at −175°.

In a second phase P2, when the boat 1 navigates under the control of the autopilot module 50, the management module 40 receives in a step S4 the apparent wind angle value AWAV indicating the angle between the wind direction and the sailing direction of the sailing boat 1.

The apparent wind angle is measured by the wind angle sensor 20 which sends the measured apparent wind angle value AWAV to the management module 40. The management module 40 also receives the boat speed value, e.g., from the on-board computer 30, and the wind speed value indicating the speed of the wind, e.g., from a wind speed sensor, and calculates the true wind angle value TWAV of the wind angle using the received apparent wind angle value and said boat speed value in a step S5, using an equation known in the art.

Then, in a step S6, the management module 40 generates a control command CC to control the wind angle of the boat 1 between the first angle threshold FAT1 and the second angle threshold FAT2.

Advantageously, in one or several additional embodiments, the management module 40 may adapt the control command CC taking into account, beside the wind angle value, other extra parameters.

The management module 40 is configured to receive at least one extra boat data and to modify the generated control command prior to sending said control command to the autopilot module 50, modifying thus the first angle threshold FAT1 and the second angle threshold FAT2, using the received at least one extra boat data.

In an embodiment, the management module is configured to receive or determine the course of the boat and the control command is generated in order to keep said course within a predefined course range relative to the boat course. The course may be derived from either the apparent wind angle, the true wind angle, the magnetic course or the GPS course. For example, the course range may be equal to [−20°; +20°] or [+0°; −20°].

In an embodiment, the predefined range is predefined in relation to the wind angle value. For example, if the wind angle value ranges between 0° and 90°, the course range may be equal to [−10°; +10°] and if the wind angle value ranges between 90° and 180°, the course range may be equal to [−20°; +20°].

In an embodiment, the at least one extra boat data is a wind speed value indicating the apparent speed of the wind and the management module 40 is configured to modify the generated control command in order to modify the first angle threshold FAT1 and the second angle threshold FAT2 depending on said wind speed value, avoiding thus an overload on the rigging and sails of the boat 1. For example, the management module 40 may increase the absolute value of the first angle threshold FAT1 and reduce the absolute value of the second angle threshold FAT2 when the wind speed value is above a predetermined wind speed threshold or depending on the polar table. For example, the management module 40 may receive a wind speed value indicating the speed of the wind, then determine the weather helm or the lee helm of the boat 1 using said received wind speed value and then limit or extend the evasion range depending upon the wind speed. For example, if the wind speed is greater than 20 kts (knots) and the true wind angle value is smaller than 90° then the evasion range of the boat 1 can be limited to windward. This limitation can be skipped if a small heel angle, e.g. smaller than 15° for a monohull, is detected with the heel sensor. This limitation could also be skipped if a small weather helm is detected by e.g. rudder force sensor or if the boat 1 could ease the sheet with sheet control.

The management module 40 may also receive an information indicating that the engine of the boat is on or receiving a speed boat value indicating the speed of the boat and, when the engine is on or when the speed boat value is smaller than a predetermined speed threshold, extends the evasion range. For example, if a 40-feet cruising mono-hull sailing boat 1 is moving at a speed of 6 kts at a wind angle of 90° and the wind speed sensor 21 measures 2 kts of wind speed, then the management module 40 assumes that the engine 14 is running as it is not possible for such a cruising sailing boat 1 to sail that fast in such a combination of wind speed and wind angle. For example, if a 50-feet multihull sailing boat 1 is moving at a speed of 7 kts and the wind speed sensor 21 measures 10 kts of wind speed and the apparent wind angle value AWAV is equal to 5° then the management module 40 assumes that the engine 14 is running and the boat 1 is running under engine 14 motor powered almost directly against the wind as it is not possible to have such speed at such direction in these wind conditions. In both cases, as the boat 1 is using its engine 14, the evasion range can be extended as the use of the engine implies that the wind angle can be kept more easily and thus less probability of tacking. For example, if the system detects that the engine 14 is running and that no sail is flying, then tacking and jibing are not relevant anymore (no sail on) and the evasion range may thus not be limited anymore.

The management module 40 may also detect shallow water zones or obstacles and adapt the evasion range according to said detected shallow water zones or obstacles. For example, the management module 40 may detect a floating hazard next to a danger shallow area. From the boat's 1 point of view, the floating hazard is just in front of the boat and the shallow area according to the marine chart is 50 meters away to the right from the floating hazard. In this case, the management module 40 may set the evasion range such that the boat 1 will pass the floating hazard on its left side.

The management module 40 may also receive data from the sounder 24 and improve the accuracy of the positioning on the marine chart by providing a plausibility check on the detected shallow water zones or obstacles using said received sounder data. For example, if the sounder 24 and the marine chart do not report the same depth at the same location (with tolerances due to tide, waves, air pressure, . . . ), the plausibility check fails and the management module 40 must not take these information for setting the evasion range and an alarm can be triggered to inform the skipper of the failure of the plausibility check. At the opposite, if the plausibility check is passed, the management module 40 can set the evasion range more accurately, e.g. safety distance to shore or shallow areas could be reduced.

The management module 40 may also receive tide stream data and improve the accuracy of the positioning on the marine chart using said tide stream data. For example, if according to the tide stream data and current time, water is at a specific height (e.g. high water), then it may be possible to sail over some shallow areas, which would not be possible if at that current time, it was low water.

Then, in a step S7, the management module 40 sends said generated control command to the autopilot module 50 in order for said autopilot module 50 to control the trajectory of the sailing boat 1 using said control command.

Preferably, the management module 40 periodically receives the apparent wind angle value AWAV, for example every second or every a few seconds or every minute, calculates the true wind angle value TWAV and adapt the evasion range (i.e. the first angle threshold FAT1 and the second angle threshold FAT2) accordingly in real time.

The invention claimed is:

1. A management module for a sailing boat, said sailing boat comprising a wind angle sensor configured to measure the wind angle value of the boat indicating the angle between the wind direction and the sailing direction of the sailing boat, said wind angle value being comprised between −180° and +180°, and an autopilot module configured to receive control commands and to control the trajectory of said sailing boat using said control commands, said management module being configured to:
receive the wind angle value from said wind angle sensor,
generate a control command to control the boat in order to keep the wind angle of the boat between a first angle threshold and a second angle threshold wherein said first angle threshold and said second angle threshold are:
greater than or equal to 0° and smaller than or equal to +180° when the wind angle value is between 0° and +180°, and
greater than or equal to −180° and smaller than or equal to 0° when the wind angle value is between −180° and 0°,
send said generated control command to the autopilot module in order for said autopilot module to control the trajectory of the sailing boat using said control command.

2. The management module according to claim 1, wherein the management module is configured to receive or determine the course of the boat and wherein the control command is generated in order to keep said course within a predefined course range relative to the boat course.

3. The management module according to claim 2, wherein the course range is predefined in relation to the wind angle value.

4. The management module according to claim 1, wherein, the received wind angle value being related to the apparent wind angle, the management module is configured to receive a boat speed value indicating the speed of the boat and a wind speed value indicating the speed of the wind and to calculate the true wind angle value of the boat using the received apparent wind angle value, said received speed value and said received wind speed value and to generate the control commands using said true wind angle value.

Alternatively, the management module may directly use the true wind speed data available on the boat network.

5. The management module according to claim 1, said management module being configured to receive at least one extra boat data and to modify the generated control command prior to sending said control command to the autopilot module, modifying thus the first angle threshold and the second angle threshold, using the received at least one extra boat data.

6. The management module according to claim 5, wherein the at least one extra boat data is a wind speed value indicating the speed of the wind and wherein the management module is configured to modify the generated control command according to said wind speed value.

7. The management module according to claim 5, wherein the at least one extra boat data is an information indicating that the engine of the boat is on or is a speed boat value indicating the speed of the boat and wherein the management module is configured to modify the generated control command in order to extend the range defined between the first angle threshold and the second angle threshold when the engine is on or when the speed boat value is smaller than a predetermined speed threshold.

8. The management module according to claim 5, said management module being configured to detect shallow water zones or obstacles and to modify the generated control command in order to avoid said detected shallow water zones or obstacles.

9. The management module according to claim 5, wherein, the boat further comprising a sounder, said management module is configured to receive data from said sounder, to provide a plausibility check on the detected shallow water zones or obstacles using said received sounder data and to modify the generated control command based on said probability check.

10. The management module according to claim 5, wherein the at least one extra boat data is a tide stream value indicating and wherein the management module is configured to modify the generated control command based on the received tide stream value.

11. The management module according to claim 5, wherein the at least one extra boat data comprises water current data indicating the direction and strength of the water current and the management module is configured to adapt the control commands to pass over said obstacle depending on said direction and strength of the water current.

12. The management module according to claim 5, wherein the at least one extra boat data comprises data from a gyroscopic sensor and the management module is configured to estimate the wave conditions based on said received gyroscopic data and to modify the generated control command based on the estimated wave conditions.

13. The management module according to claim 5, wherein the at least one extra boat data comprises the sails configuration of the boat and wherein the management module is configured to adapt the generated control command depending upon said received sails configuration prior to sending said set evasion range to the path planning module.

14. A sailing boat comprising a management module according to claim 1 and an autopilot module, said autopilot module being configured to receive control commands and to control the trajectory of said sailing boat using said control commands.

15. A method of optimizing the path planning of a sailing boat according to claim 14 depending on the wind angle, said method comprising, for the management module, the steps of:
- receiving from the wind angle sensor a wind angle value indicating the angle between the wind direction and the sailing direction of the sailing boat,
- generating a control command to control the wind angle of the boat between a first angle threshold and a second angle threshold wherein said first angle threshold and said second angle threshold are:
  - greater than or equal to 0° and smaller than or equal to +180° when the wind angle value is between 0° and +180°, and
  - greater than or equal to −180° and smaller than or equal to 0° when the wind angle value is between −180° and 0°,
- sending said generated control command to the autopilot module in order for said autopilot module to control the trajectory of the sailing boat using said control command.

* * * * *